United States Patent [19]

Itoh et al.

[11] Patent Number: 4,982,292
[45] Date of Patent: Jan. 1, 1991

[54] METHOD AND APPARATUS FOR PROCESSING PEL SIGNALS OF AN IMAGE

[75] Inventors: Masaharu Itoh; Kazuharu Toyokawa, both of Yamato; Hiroshi Yanagisawa, Kamakura, all of Japan

[73] Assignee: International Business Machines Corporation, Armonk, N.Y.

[21] Appl. No.: 252,193

[22] Filed: Sep. 30, 1988

[30] Foreign Application Priority Data

Oct. 9, 1987 [JP] Japan ............................... 62-253925

[51] Int. Cl.$^5$ ............................................ H04N 1/419
[52] U.S. Cl. ................................... 358/426; 358/261.3
[58] Field of Search ............... 358/262.1, 261.1, 261.2, 358/261.3, 261.4, 426, 427

[56] References Cited

U.S. PATENT DOCUMENTS

4,254,438  3/1981  Yamazaki et al. ............... 358/261.1

Primary Examiner—Edward L. Coles, Sr.
Assistant Examiner—Jerome Grant, II
Attorney, Agent, or Firm—Thomas P. Dowd

[57] ABSTRACT

A system for processing image data of a text document in compressed form wherein pel signals of the original image are stored in pel positions in an input image buffer and the pel signals stored in every other pel (EOP) positions in the input buffer are sequentially fetched, along with respective pluralities of neighboring pel signals stored in EOP positions and compressed by adaptive arithmetic compression to generate a first set of compressed data which is stored in a memory. The pel signals stored in remaining pel (RP) positions in the input image buffer are also sequentially fetched, along with respective pluralities of neighboring pel signals, including at least one signal stored in an RP position and a plurality of signals stored in EOP positions, and compressed by adaptive arithmetic compression to generate a second set of compressed data which is stored in a memory. The first and second sets of compressed data may be decompressed to reproduce the pel signals stored at EOP positions, and the pel signals stored in RP positions along with their respective pluralities of neighboring pel signals stored in EOP positions, and stored in an output image buffer. The fetching operation includes selecting one of a plurality of sampling windows, each having a different sampling pattern, for sampling the pel signals making up the first and second sets of data during compression and decompression to achieve the improved data volumes.

18 Claims, 8 Drawing Sheets

METHOD AND APPARATUS FOR PROCESSING PEL SIGNALS OF AN IMAGE

BACKGROUND OF THE INVENTION

1. Field of the Invention

The invention relates to a method and apparatus for processing image data of a text document, and more particularly, for handling the transmission of compressed data, representing the image data of the text document, between a terminal unit and a host processor.

2. Prior Art

In image processing systems, an image of an original document is typically scanned by an image scanner that includes an image sensor unit having a plurality of sensor elements. The number of sensor elements/inch defines the resolution of the image scanner. Each sensor element defines one pel and generates an analog signal representing a pel of the image of the original document. These analog signals are converted to digital signals which are compressed by an image compression algorithm well known in the art, such as, for example, CCITT standard Modified Read. The compressed data representing the image is then transmitted to a memory in a host processor.

When the image is to be utilized, the stored compressed data is read out and decompressed. The decompressed data is supplied to an output device, such as a display unit or a printer, which will reproduce the image. The scanner and the output devices may have various resolutions, e.g., 120 pels/inch, 240 pels/inch. In the situation where the resolution of the original image is 240 pels/inch and the resolution of the display unit is 120 pels/inch, it is clear that the display unit does not require input data of 240 pels/inch resolution. In such a case, however, compressed iimage data of 240 pels/inch resolution is transmitted from the host processor to a terminal unit where it is decompressed by an image decompression algorithm, to reproduce the original image at 240 pels/inch resolution. The reproduced image must then be scaled to generate the display image at 120 pels/inch resolution. Thus, while the display unit only requires input date of 120 pels/inch resolution, nevertheless transmission and decompression of the high volume of data involved with 240 pels/inch resolution is carried out. To avoid this problem, i.e., the transmission and decompression of the high volume of data, a solution might be for the host system to prepare both compressed data of 240 pels/inch resolution and compressed data of 120 pels/inch resolution and to store them in the memory. This approach, however, while solving the transmission problem, raises the problem of requiring about 1.5 times memory space for the compressed data of 120 pels/inch and 240 pels/inch resolutions.

U.S. Pat. No. 4,682,869 to Itoh et al discloses an image processing system wherein an original image is converted to a low resolution image, i.e., base image, by a pel density conversion algorithm. Then, the same density image as the original image is predicted from the base image; the predicted image and the original image are compared to generate error compensation data; and both the base image and error compensation data are compressed and stored for a later image reproducing process. This process is similar to the invention disclosed herein in constructing a two layered data base, but the present invention is remarkably different in providing an algorithm for compression and decompression of the second layer.

U.S. Pat. No. 4,901,363 to K. Toyokawa discloses a system for compressing bi-level data wherein history pels which are adjacent pels to a current pel being processed and pels so separated from the adjacent pels as to adapt to a period of a dither matrix, are sampled and it is determined from the sampled pels whether the image has a dither dominant image pattern or a text-graphic dominant image pattern. The teaching in that . application, however, does not involve the construction of a two layered data base.

Arranging image data in a hierarchical or pyramidal manner is well known in the art and described, for example, in U.S. Pat. No. 4,222,076 to K. C. Knowlton and in an article by K. R. Sloan, Jr. and S. L. Tanimoto, "Progressive Refinement of Raster Images," in IEEE Transactions on Computers, Vol. C-28, No. 11, November 1979, pp. 871-874. However, the image data structures have been devised with the purpose of data retrieving, and the data contents of the respective layers are different from those of the invention. Further, the hierarchical systems have a disadvantage that larger storage space is required as compared with the present invention.

Glen G. Langdon, Jr. in "An Introduction to Arithmetic Coding," IBM Journal of Research and Development, Vol. 28, No. 2, March 1984, pp. 135-149 describes the basic concept of arithmetic coding for compressing original data and for decompressing or reproducing the original data from the compressed data. The present invention draws from and utilizes the principles and techniques of this type of coding in achieving its improved results.

SUMMARY OF THE INVENTION

The present invention realizes a remarkable reduction in the volume of compressed data required for representing an original image of a text document while achieving a high degree of reproduction of the original image when the data is decompressed.

In accordance with the invention an original image of a text document may be scanned by an image scanner, of a comparatively high resolution, such as, for example, 240 pels/inch, which is part of a terminal device. The resolution of 240 pels/inch, for convenience, will be referred to as 240 pel resolution hereinafter and "pel" will be understood to mean picture element. The image scanner generates a pel signal or binary data for each pel of the original image sampled at the 240 pel resolution and these pel signals of 240 pel resolution are stored in an input image buffer, which is another part of the terminal device, at the 240 pel resolution.

The pel signals thus stored in the pel positions of the input image buffer are then selectively fetched to generate (1) a first set of compressed data of image pels of a lesser resolution, such as 120 pel resolution (i.e., a resolution of 120 pels/inch), and (2) a second set of compressed data of remaining pels. In this regard, the pel positions of the input image buffer may be classified, for the purpose of explanation, into "every other pel positions" and "remaining pel positions", hereinafter EOP positions and RP positions, respectively. The pel signals or binary data at the EOP positions may represent the image of the text document of 120 pel resolution. The pel signals stored at the RP positions, that is, the remaining pel signals, represent the remaining pels of the text document. Thus, the original image of the text document of 240 pel resolution will consist of sets of signals in the input image buffer representing the pels of the 120 pel resolution image and the remaining pels.

To selectively fetch the pel signals stored in the input image buffer, four sampling windows are prepared. A first sampling window fetches one pel signal (as a current pel signal being processed), which is stored at one of the EOP positions, and plural neighboring pel signals which are stored at others of the EOP positions. The sampling points of the first window are arranged at the 120 pel resolution. Second, third and fourth sampling windows are used to fetch or sample both pel signals of the 120 pel resolution and remaining pel signals in various combinations. The patterns of the second, third and fourth sampling windows differ from each other and are arranged at the 240 pel resolution.

To generate the first set of compressed data of the image pels of 120 pel resolution, an adaptive arithmetic compression algorithm in a control unit of the terminal device selects the first window and accesses the input image buffer. By initially locating the first window at the left. most and uppermost pel position of the input image buffer and then moving the first window in horizontal and vertical directions to scan all of the EOP positions, a current pel signal and a set of neighboring pel signals are sequentially fetched and supplied to an adaptive arithmetic coding compression/decompression unit of the terminal device, which unit generates the first set of compressed data of the image pels of 120 pel re solution. This first set of compressed data is transmitted to and stored in a data memory of a host processor.

Next, the compression algorithm selects one of the second, third and fourth windows depending upon the position of a remaining pel signal, i.e., the RP position of the current pel signal being processed. The current pel signal and a plurality of neighboring pel signals, including both remaining pel signals and pelsignals of the 120 pel resolution, are fetched in accordance with the pattern of the selected window, and are supplied to the adaptive arithmetic coding compression/decompression unit to generate the second set of compressed data of the remaining pels. The second set of compressed data is transmitted to and stored in the data memory in the host processor.

Consequently, the data memory of the host processor has stored therein both the first set of compressed data of the image pels of 120 pel resolution and the second set of compressed data of the remaining pels.

The terminal device may include, or be operatively connected to, output devices of differing resolution, such as, in keeping with the examples, a display unit of 120 pel resolution and a printer of 240 pel resolution. When it is required to display the image of the text document on the display unit of 120 pel resolution, only the first set of compressed data of the image pels of 120 pel resolution is fetched from the data memory and transmitted to the adaptive arithmetic coding compression/decompression unit of the terminal device. An adaptive arithmetic coding decompression algorithm in the control unit of the terminal device then selects the first sampling window which was used in the compression of the image pels of 120 pel resolution. The contents of an output image buffer into which the reproduced pel signals are to be inserted and stored are reset. This output image buffer has pel positions for pel signals of both 120 and 240 pel resolution. The decompression algorithm positions or locates the first window at the first pel position of the EOP positions. Only the neighboring pel signals among the pel signals sampled by the first window are supplied to the adaptive arithmetic coding compression/decompression unit along with the first set of compressed data. The adaptive arithmetic coding compression/decompression unit reproduces a first pelsignal of the image pels of 120 pel resolution and stores it in the first pel position of the EOP positions of the output image buffer. The decompression algorithm shifts the first window by two pel positions on the output image buffer, reproduces a second pel signal and stores it in the second position of the EOP positions, and continues shifting and reproducing in the same manner through the buffer. The decompression algorithm in this manner reproduces the image of 120 pel resolution, and stores its pels in the output image buffer. The control unit then acts to supply the image of 120 pel resolution to the display unit of 120 pel resolution.

When it is required to print the original image of the text document by the printer of 240 pel resolution, the fetch and decompression process for the first set of decompressed data and the fetch and decompression process for the second set of decompressed data are sequentially performed. The fetch and decompression process for the first set of decompressed data is the same as that described above, so that to begin with the pel signals of the image pels of 120 pel resolution are stored in the EOP positions of the output image buffer. The second set of compressed data of the remaining pels stored in the data memory of the host processor is then transmitted to the adaptive arithmetic coding compression/decompression unit of the terminal device. The decompression algorithm decompresses the second set of compressed data to reproduce the remaining pel signals and stores them in the remaining pel (RP) positions of the output image buffer. To perform this process, the decompression algorithm detects the position in the output image buffer of the first remaining pel signal being reproduced, and selects one of the second, third and fourth windows, that was used in the compression of the remaining pels, in accordance with the detected position. Only the neighboring pel signals among the pel signals sampled by the selected window are supplied to the adaptive arithmetic coding compression/decompression unit along with the second set of compressed data. The adaptive arithmetic coding compression/decompression unit reproduces the first remaining pel signal being reproduced and stores it in the detected RP position of the output image buffer. The decompression algorithm seeks the second RP position into which the second reproduced remaining pel signal is to be inserted and stored, and selects one of the second, third and fourth windows in accordance with the detected position. It reproduces the second remaining pel signal, and stores it in the second RP position of the output image buffer. In this manner, the remaining pel signals are sequentially reproduced. At the completion of the reproduction of the remaining pelsignals, the output image buffer contains the original image of 240 pel resolution. This reproduced image is then supplied to the printer of 240 pel resolution.

As stated above, in accordance with the present invention, the plural windows having different sampling patterns from each other are prepared for processing the remaining pel signals, and one of the plural windows is selected in accordance with the pel position of the current remaining pel signal being compressed or decompressed. It has been found by the inventors that the preparation of the plural windows and the selection of one of the windows in accordance with the position of the current remaining pel signal, when compressing the remaining pel signals of the text image by use of the adaptive arithmetic coder, has remarkably reduced the data volume of the compressed data, as will be described more fully hereinafter with respect to FIG. 12.

DESCRIPTION OF THE PREFERRED EMBODIMENT

Figure 1:
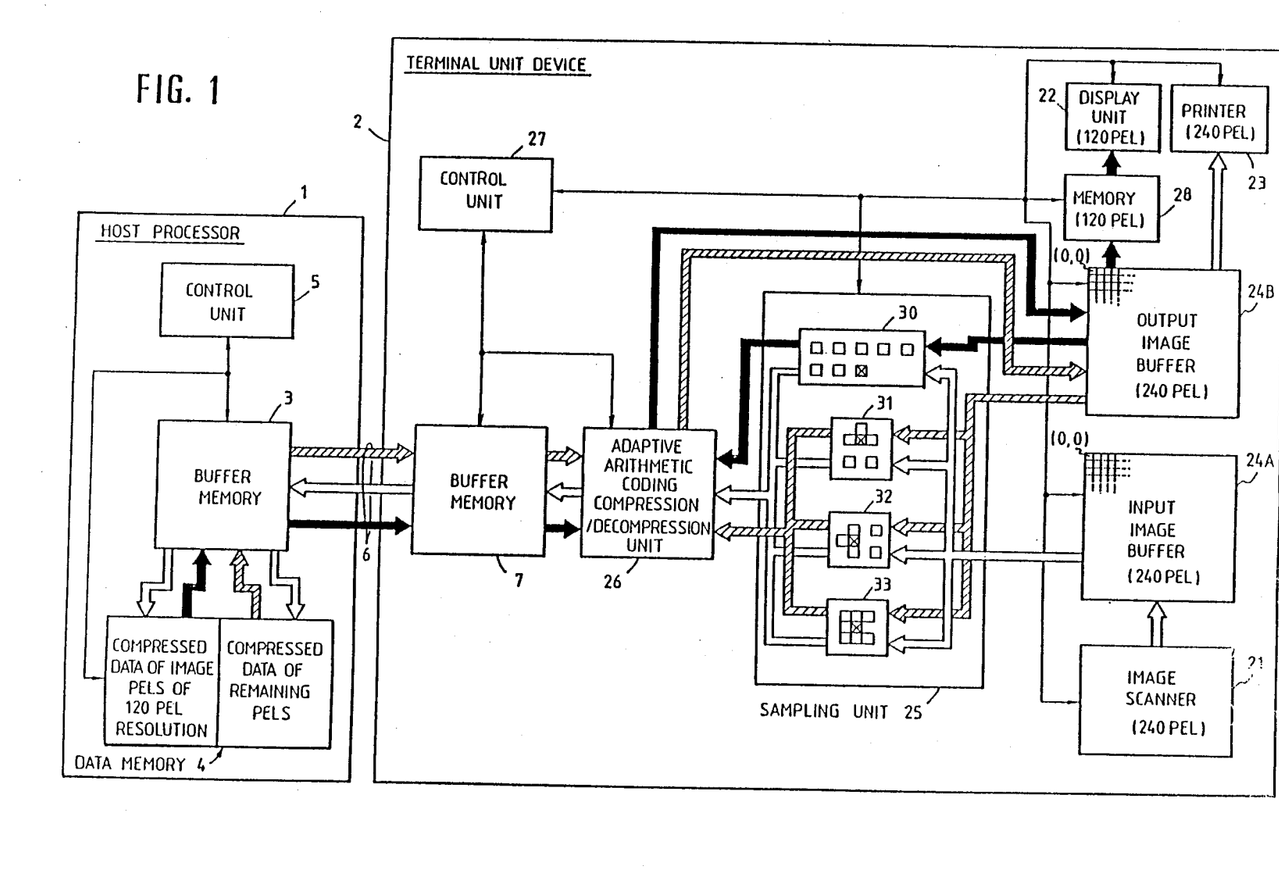
FIG. 1 is a block diagram of an image processing apparatus in accordance with the present invention.

An exemplary system for carrying out the present invention is shown generally in FIG. 1 and includes a host processor 1 and a terminal device 2 connected through a transmission line 6. The host processor 1 includes a buffer memory 3, a data memory 4, and a control unit 5. The terminal device 2 includes a buffer memory 7, an image scanner 21 (of 240 pel resolution), a display unit 22 (of 120 pel resolution), a printer 23 (of 240 pel resolution), an input image buffer 24A, an output image buffer 24B, a sampling unit 25, an adaptive arithmetic coding compression/decompression unit 26, and a control unit 27. Both the input and output image buffers 24A and 24B have pel positions sufficient to store image signals of a desired resolution, which for present purposes is preferably 240 pels/inch. An original image of a text document, not shown, may be scanned by the image scanner 21, which also preferably is of 240 pel resolution and generates binary bits or pel signals representing the original image. For example, a black pel of the image is re presented by binary 1 and a white pel of the image is represented by binary 0. The binary bits or the pel signals representing the original image are stored in the input image buffer 24A.

Generation of the First Set of Compressed Data of the Image Pels of 120 Pel Resolution With the original image so stored, the pel signals may then be processed in the following manner of the invention beginning with compressing the data for storage in data memory 4. Although the data has been stored at 240 pel resolution in buffer 24A, it may be stored in memory 4 at a different resolution, which for present purposes may be 120 pels/inch.

Figure 2:
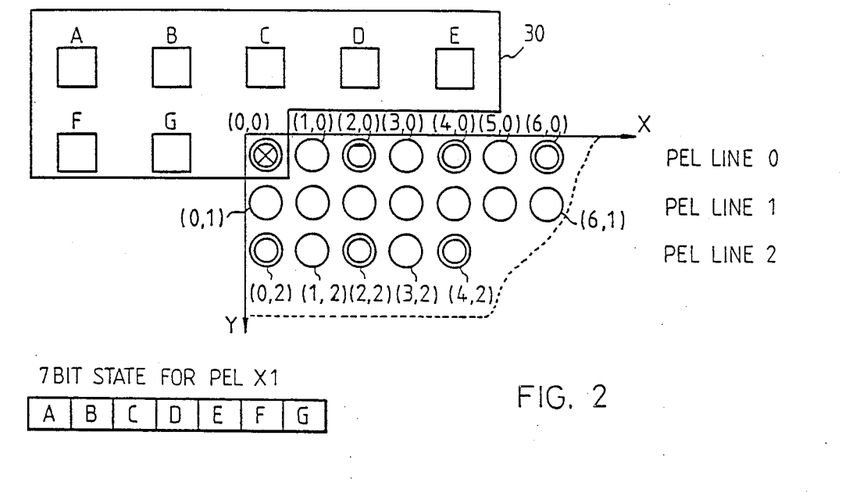
FIGS. 2 and 3 illustrate the positioning of a sampling window to sample the pel signals stored in every other pel (EOP) positions.
Figure 3:
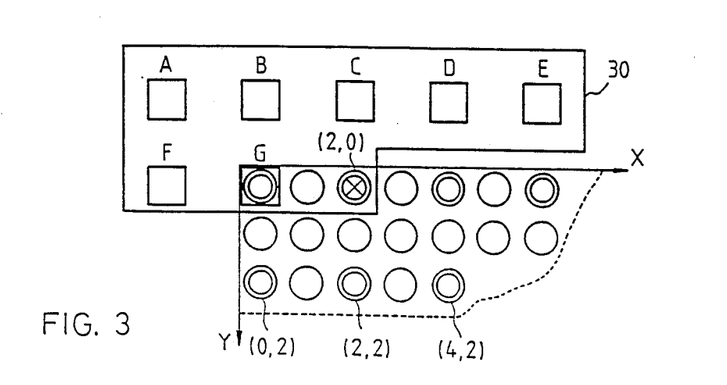

The flow of the data in the first part of the process of the invention is shown by the thick white arrows in FIG. 1. Under the control of the compression algorithm of the control unit 27, the sampling unit 25 selects a template or sampling window 30. FIGS. 2 and 3 illustrate the positioning of the sampling window with respect to the signals or pels in buffer 24A. The symbol X represents the current pel signal being processed. Double circled pels, i.e., every other pel in the Figures, represent the image pels of 120 pel resolution, and single circled pels represent the remaining pels. The compression process is started from the leftmost and uppermost pel of the original image which is stored at position (0, 0) in the input image buffer 24A. The sampling unit 25 positions or locates the window 30 at the position shown in FIG. 2 to process the current pel X, under the control of the compression algorithm of unit 27.

Sampling points A, B. C, D, E, F, G and X of the window 30 are spaced by an amount corresponding to the distance between adjacent "every other pel" (EOP) positions in the input and output image buffers, 24A and 24B, respectively. The window 30 is thus adapted to sample the current pel signal X at one of the EOP positions shown by the double circles and seven neighboring pel signals at EOP positions. The EOP positions store the pel signals of the image pels at 120 pel resolution.

The seven sampling points A through G of the window 30 are shown in FIG. 2 as viewing outside the area of the image. This outside area is deemed to be white, i.e., binary 0. All of the sampled seven bits A through G of binary 0 and the current pel signal X are supplied to the adaptive arithmetic coding compression/decompression unit 26, which includes a state table, an adaptive arithmetic coder and an adaptive arithmetic decoder, for example, as described in the aforementioned IBM Journal of Research and Development article by Glen G. Landon, Jr. A suitable state table is shown in the following Table.

TABLE

| | | | | | | | | State Table | | | |
|---|---|---|---|---|---|---|---|---|---|---|---|
| | | | | | | | | MOST PROBABLE SYMBOL | | | PROBABILITY OF LEAST |
| | | | STATE | | | | | | | | |
| ENTRY | A | B | C | D | E | F | G | $X = 0$ | $X = 1$ | Total | PROBABLE SYMBOL |
| 0 | 0 | 0 | 0 | 0 | 0 | 0 | 0 | 100 | 1 | 101 | 0.0099 |
| 1 | 0 | 0 | 0 | 0 | 0 | 0 | 1 | 20 | 50 | 70 | 0.286 |
| 2 | 0 | 0 | 0 | 0 | 0 | 1 | 0 | 8 | 1 | 9 | 0.111 |
| 31 | 0 | 0 | 1 | 1 | 1 | 1 | 1 | 35 | 42 | 77 | 0.454 |
| 32 | 0 | 1 | 0 | 0 | 0 | 0 | 0 | 80 | 10 | 90 | 0.111 |
| 33 | 0 | 1 | 0 | 0 | 0 | 0 | 1 | 45 | 50 | 95 | 0.473 |
| 63 | 0 | 1 | 1 | 1 | 1 | 1 | 1 | 4 | 90 | 94 | 0.044 |
| 64 | 1 | 0 | 0 | 0 | 0 | 0 | 0 | 91 | 2 | 93 | 0.021 |
| 65 | 1 | 0 | 0 | 0 | 0 | 0 | 1 | 68 | 23 | 91 | 0.252 |

TABLE-continued

State Table

| ENTRY | STATE | | | | | | | MOST PROBABLE SYMBOL | | | PROBABILITY OF LEAST |
|---|---|---|---|---|---|---|---|---|---|---|---|
| | A | B | C | D | E | F | G | X = 0 | X = 1 | Total | PROBABLE SYMBOL |
| 125 | 1 | 1 | 1 | 1 | 1 | 0 | 1 | 2 | 97 | 99 | 0.020 |
| 126 | 1 | 1 | 1 | 1 | 1 | 1 | 0 | 4 | 95 | 99 | 0.042 |
| 127 | 1 | 1 | 1 | 1 | 1 | 1 | 1 | 1 | 100 | 101 | 0.0099 |

The first and second columns of this state table indicate ENTRY and STATE. The STATE represents the bit pattern A through G sampled by the window 30. The third column indicates the MOST PROBABLE SYMBOL which is predicted based upon the bit pattern sampled by the window. The fourth column indicates the PROBABILITY of the LEAST PROBABLE SYMBOL. For example, when the sampled pel signals A through G are binary 0, as in the case of FIG. 2, the current pel signal X will have the binary value 0 with a ratio of 100:1, and the probability of the least probable symbol, i.e., the binary 1, is 0.0099. The bit patterns sampled by the windows 30, 31, 32 and 33 are used as addresses for accessing the state table. The contents of the third and fourth columns are updated by the algorithm in the control unit 27 to adapt to the quality of the original image. The algorithm maintains a total count of the symbols and revises the values of the probability of the least probable symbol in the manner as described in the above-cited article by G. G. Landon, Jr. and in the IBM Technical Disclosure Bulletin in Volume 22, No. 7, December 1979, pp. 2880–2882, entitled, "Method for Coding Counts to Coding Parameters," by G. G. Landon, Jr. and J. J. Rissanen. The latter article indicates that it is desired to detect changes in the symbol probabilities from observed symbol occurrences and to modify the least probable symbol probability.

Referring to FIG. 2 again, the seven bit state A through G, or the bit pattern 0000000, for the current pel signal X at the position (0, 0) accesses the entry 0 of the state table. The algorithm compares the actual value of the current pel signal X at the position (0, 0) with the content of the third column. If the current pel signal X is binary 0, the result of the comparison is YES, and, the result of the comparison and the value of the probability of the least probable symbol in the fourth column in the entry 0 are supplied to the adaptive arithmetic coder in unit 26. Then, the window 30 is shifted by two pel positions in the X direction to process the next current pel X, at position (2, 0), as shown in FIG. 3. The bit pattern A, B, C, D, E, F, G is used as an address to access the state table, and the result of the comparison of the current pel signal X at the position (2, 0) with the content of the third column of the state table, and the value of the fourth column are supplied to the adaptive arithmetic coder. In this manner, the pel signals at every other pel position, i.e., the double circled pel signals at the positions (0, 0), (2, 0), (4, 0), (6, 0) . . . of the pel line 0, are processed. The adaptive arithmetic coder generates a code string of compressed data of the processed pel signals at the 120 pel resolution. Once the pel line 0 has been processed, the window 30 is positioned to process the first pel signal at position (0, 2) of the pel line 2, and the pel signals at the positions (0, 2), (2, 2), (4, 2), (6, 2) . . . of pel line 2 are processed in the above manner. The same process is repeated for the pel signals at 120 pel resolution in the even numbered pel lines of the original image data stored in the input image buffer 24A. It will be appreciated that the original image data was stored in the input image buffer 24A at a 240 pel resolution, and the processed double circle pel signals, i.e., every other pel signal in the X and Y direction, constructs the image at 120 pel resolution, so that the code string or the first set of compressed data generated by the adaptive arithmetic coder represents the image at 120 pel resolution. This first set of compressed data of the image pels of 120 pel resolution is transmitted to the buffer memory 3 of the host processor 1 through the buffer memory 7 and the transmission line 6, and stored in the data memory 4 under the control of the control unit 5 of the host processor 1.

Figure 4:
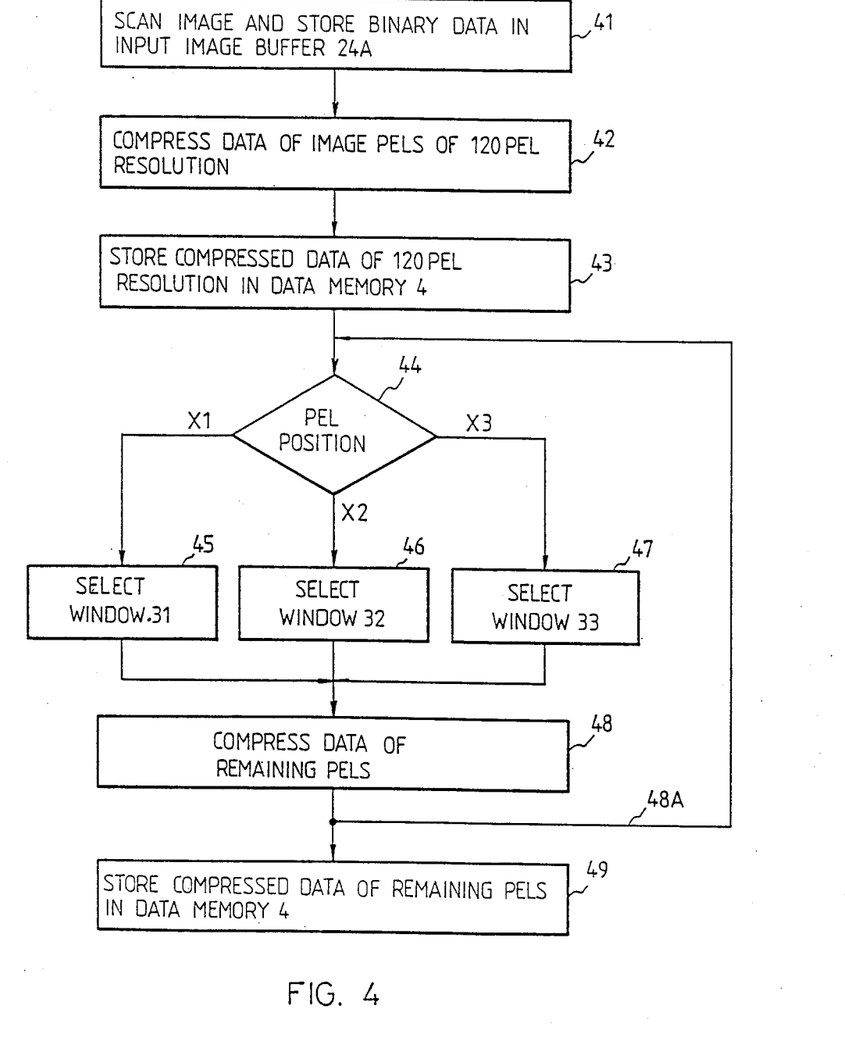
FIG. 4 is a flow chart illustrating the generation of the first and second sets of compressed data.

The flow of the above operations is shown in the blocks 41, 42 and 43 in FIG. 4.

Generation of the Second Set of Compressed Data of the Remaining Image Pels

To generate the second set of compressed data of the remaining pels in the original image, the pel signals retained in the input image buffer 24A are again accessed. The remaining pels are read out by the windows 31, 32 and 33, until all of the remaining pel signals have been processed.

Figure 5:
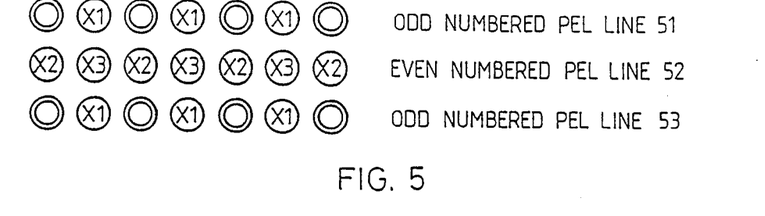
FIG. 5 shows the positions of the remaining pel (RP) signals X1, X2 and X3.
Figure 6:
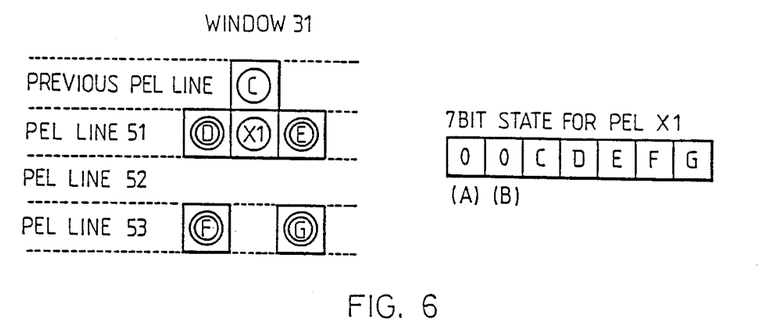
FIG. 6 shows the sampling window 31 selected for the remaining pel signal X1.
Figure 7:
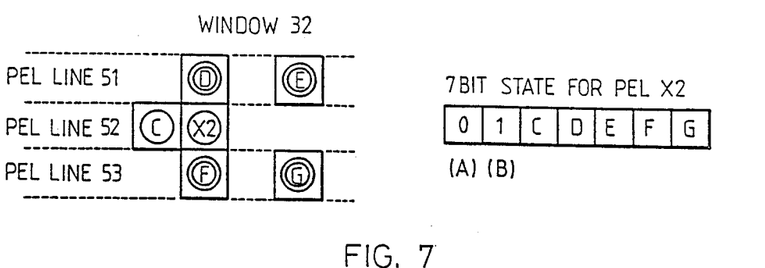
FIG. 7 shows the sampling window 32 selected for the remaining pel signal X2.
Figure 8:
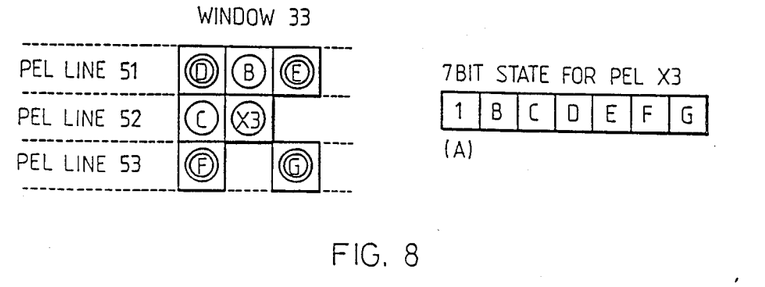
FIG. 8 shows the sampling window 33 selected for the remaining pel signal X3.

More particularly, referring to FIG. 5, it will be seen that the remaining pel (RP) signals, indicated by the single circles in the input image buffer 24A, are classified into pel signals X1, X2 or X3 depending upon their positions. The pel signals X1 exist between each two horizontally arranged pel signals of the 120 pel resolution image; the pel signals X2 exist between each two vertically arranged pel signals of the 120 pel resolution image; and, the pel signals X3 exist at the center of each set of four pel signals of the 120 pel resolution image. These remaining pel (RP) signals X1, X2 and X3 are respectively processed using the windows 31, 32 and 33 shown in FIG. 1. The details of the windows 31, 32 and 33 are shown in FIGS. 6, 7 and 8, wherein the small squares represent the sampling points of these windows.

In the course of the window processing both the remaining pel (RP) signals, indicated by the single circles, and the pel signals of the 120 pel resolution image, indicated by the double circles, in FIG. 5 are sampled by the windows 31, 32 and 33. The particular one of the windows 31, 32 and 33 selected at any time depends upon the position of the current pel signal in the input image buffer 24A. The control unit 27 of the terminal device 2 monitors the position of the current pel signal in the input image buffer 24A (see block 44 in FIG. 4), and supplies a control signal to the sampling unit 25 for selecting one of the windows 31, 32 and 33 in response to the detected position of the current pel signal.

For example, referring to FIG. 5, the control unit 27 firstly selects the window 31 (see block 45 in FIG. 4) since the first RP signal, the current pel signal, in pel line 51, is an X1 existing between two horizontally adjacent pel signals of the 120 pel resolution image. FIG. 6 shows the detail of the window 31. A bit pattern, or the seven bit state, is generated, wherein the bits A and B are 00 and the bits C, D, E, F and G are the binary values of the pel signals which surround the current pel signal X1 as shown in FIG. 6. Among the neighboring pel signals sampled by the window 31, the first pel signal C is the upper pel signal in the previous pel line located above the current pel signal X1; the second pel signal D and the third pel signal E are the left and right neighboring pel signals of the current pel signal X1; and the fourth pel signal F and the fifth pel signal G are located in the pel line 53 after the next pel line 52 below the second and third pel signals D and E, respectively. The first pel signal C is the RP signal, and the second through fifth pel signals are EOP signals of the 120 pel resolution image. The value 00 of the bits A and B represents that the current pel signal being processed is the pel signal X1.

The seven bit state or bit pattern is supplied to the adaptive arithmetic coding compression/decompression unit 26, and is used as an address for accessing an entry in the foregoing state table. The compression algorithm compares the current pel signal X1 with the content of the third column of the accessed entry, i.e., the most probable symbol, and supplies the result of the comparison and the value of the probability of the least probable symbol in the entry to the adaptive arithmetic coder of the unit 26. The adaptive arithmetic coder generates a code string of compressed data for the processed pel signal (see block 48 of FIG. 4). After the first pel signal X1 has been processed, the compression algorithm finds the next RP signal in the current pel line 51, recognizes the next pel signal as an X1, and selects the window 31, as indicated by a loop 48A in FIG. 4. In this manner, the RP signals in the current pel line are processed, and the compressed data is formed.

The control unit 27 finds that the next pel line, i.e., the even numbered pel line 52 in FIG. 5, includes the alternate pel signals X2 and X3. The control unit 27 detects the position of the first pel signal (block 44), recognizes it as an X2 signal, and selects the window 32 (block 46). The window 32 configuration is shown in FIG. 7, wherein the bits A and B are 01 and the bits C, D, E, F and G are the binary values of the pel signals which surround the current pel signal X2. The first pel signal C is the left neighboring pel signal in the current pel line 52; the second pel signal D is located in the previous pel line 51 above the current pel signal X2; the third pel signal E is the pel signal after the pel signal next to the second pel signal D in the previous pel line 51; the fourth pel signal F is located in the next pel line 53 below the current pel signal X2; and the fifth pel signal G is located in the next pel line 53 below the third pel signal E. The first pel signal C is an RP signal and the second through fifth pel signals B-G are EOP signals of the 120 pel resolution image.

The values 01 of the bits A and B indicate that the current pel signal being processed is an X2. The seven bit state or bit pattern is supplied to the adaptive arithmetic coding compression/decompression unit 26, and is used as an address for accessing an entry in the foregoing state table. The compression algorithm compares the current pel signal X2 with the content of the third column of the accessed entry, and supplies the result of the comparison and the value of the probability of the least probable symbol in the entry to the adaptive arithmetic coder of the unit 26. The adaptive arithmetic coder generates a code string of compressed data of the processed pel signal (block 48).

The control unit 27 determines the position of the pel signal next to the pel signal X2 just processed, and finds that the next pel signal is classified as an RP signal X3 (block 44 of FIG. 4). It then selects the window 33 (block 47). The window 33 configuration is shown in FIG. 8, wherein the value of the bit A is 1, and the bits B, C, D, E, F and G are the binary values of the pel signals which surround the current pel signal X3. The first pel signal B is the upper pel signal in the previous pel line 51 above the current pel signal X3; the second pel signal C is the left neighboring pel signal in the current pel line 52; the third pel signal D is the left upper diagonal pel signal in the previous pel line 51 from the current pel signal X3; the fourth pel signal E is the right upper diagonal pel signal in the previous pel line 51 from the current pel signal X3; the fifth pel signal F is the left lower diagonal pel signal in the next pel line 53 from the current pel signal X3; and the sixth pel signal G is the right lower diagonal pel signal in the next pel line 53 from the current pel signal X3. The first and second pel signals B and C are RP signals, and the third through sixth pel signals are EOP signals in the 120 pel resolution image. The value 1 of the bit A indicates that the current pel signal being processed is an X3.

The seven bit state or bit pattern is supplied to the adaptive arithmetic coding compression/decompression unit 26, and is used as an address for accessing an entry in the foregoing state table. The compression algorithm compares the current pel signal X3 with the content of the third column of the accessed entry, and supplies the result of the comparison and the value of the probability of the least probable symbol in the entry to the adaptive arithmetic coder of the unit 26. The adaptive arithmetic coder generates a code string of compressed data of the processed pel signal (block 48 of FIG. 4).

In continuing the processing, the control unit 27 returns control through 48A to the block 44 to determine the pel signal at the next pel position, and finds a pel signal X2, as shown in pel line 52 in FIG. 5. This pel signal X2 is processed in accordance with the above described manner for the previous X2 signal, and then the next pel signal X3 is processed in the manner of the previous X3 signal. Accordingly, all the remaining pel signals in pel line 52 are processed as X2 and X3 signals, and then the RP signals in pel line 53 are processed as X1 signals. These operations are repeated until all RP signals in the input image buffer 24A have been processed. The second set of compressed data of RP signals is stored in the data memory 4 in the host processor 1 through the buffer memory 7 and the buffer memory 3 (block 49). The flow of the processing of the remaining pel (RP) signals is also indicated by the thick white arrows in FIG. 1.

Figure 9:
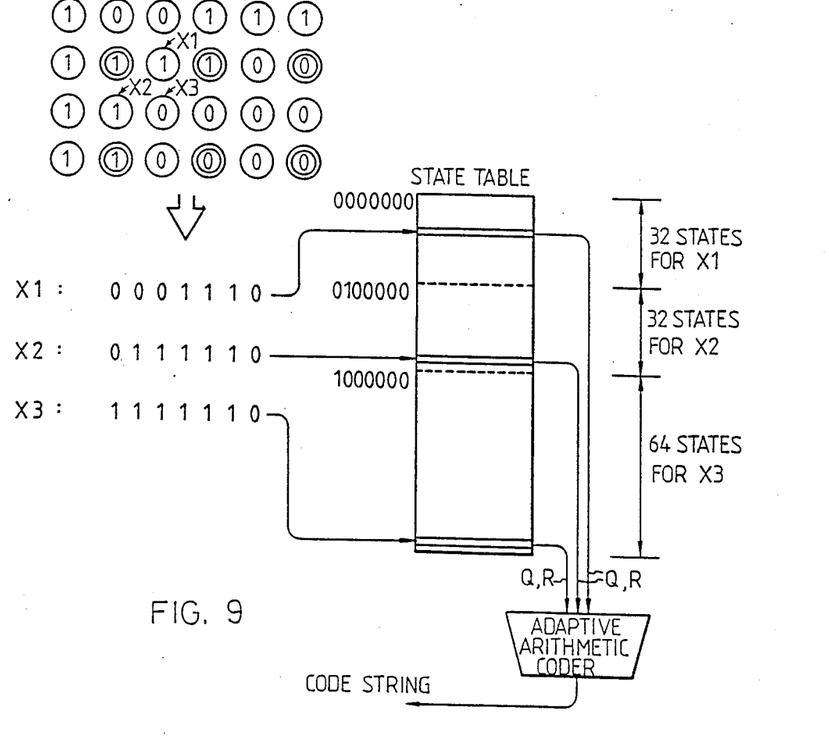
FIG. 9 shows examples of the compressing of the remaining pel signals X1, X2 and X3.

FIG. 9 graphically illustrates the process of compressing the remaining pel signals X1, X2 and X3. An example of the pel signals of the original image of the text document is shown in the upper lefthand corner of the Figure, wherein the double circled pel signals represent pels (EOP) of the 120 pel resolution image, and the single circled pel signals represent the remaining pels (RP), as described hereinbefore.

The bit pattern "0001 110" is the seven bit state for the RP signal X1, which is sampled by the window 31 shown in FIG. 6. The bit pattern "0111110" is the seven bit state for the RP signal X2, which is sampled by the window 32. And, the bit pattern "1111 110" is the seven bit state for the RP signal X3, which is sampled by the window 33. The state table and the adaptive arithmetic coder of the adaptive arithmetic coding compression/decompression unit 26 are also shown in FIG. 9. For the RP signal X1, the compression algorithm accesses the entry of the address "0001 110" in the state table and supplies (a) the result of the comparison of the current pel signal X1 and the most probable symbol in the third column of the entry, and (b) the content of the fourth column, i.e., the probability of the least probable symbol, to the adaptive arithmetic coder. In FIG. 9, the result of the comparison is shown as "R", and the content of the fourth column is shown as "Q". The adaptive arithmetic coder generates a code string of the compressed data. In the same manner, the RP signals X2 and X3 are processed. The state table includes 128 entries or states, as shown in the Table above and FIG. 9, wherein the first 32 states are assigned for the RP signals X1, the second 32 states are assigned for the RP signals X2, and the last 64 states are assigned for the RP signals X3. It will be seen, therefore, that the state table is used commonly to compress the image data of 120 pel resolution and the remaining image pels, and also is used to decompress the resulting first and second sets of compressed data as will now be explained.

Decompression of the Compressed Data

The decompression process for the reproduction of the original image is started from the pel at the position (0, 0), shown in FIGS. 1 and 2. While these figures are commonly referred to in explaining the compression and decompression processes, there exist operational differences between the compression process and the decompression process, which will be apparent from the description hereinafter. In the decompression process, (a) the first set of compressed data of the image pels (EOP) of 120 pel resolution, and/or (b) the second set of compressed data of the remaining pels (RP), which have been stored in the data memory 4 of the host processor 1, are decompressed, again using the windows 30, 31, 32 and 33 and the state table which was used in the compression process, but now in combination with the adaptive arithmetic decoder in unit 26.

Decompression of the Image Pels of 120 Pel Resolution

It is frequently required to display the original image of the document on a display unit which has a different resolution from that at which the image has been scanned and stored. For example, display unit 22 may have a 120 pel resolution, while the image pels have been stored at a 240 pel resolution. The display unit 22 will be used as an example of the output unit for purposes of the following description, but it will be seen that a printer of 120 pel resolution could be used in place of the display unit 22.

Figure 10:
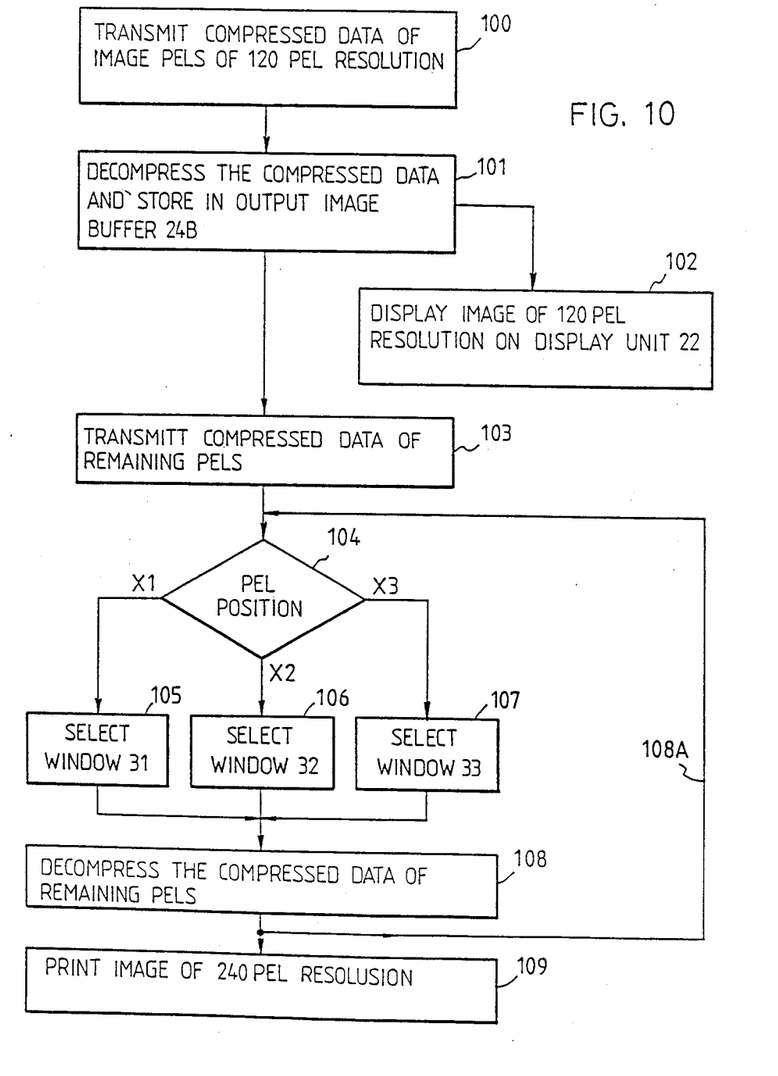
FIG. 10 is a flow chart illustrating the decompression of the first and second sets of compressed data.

The flow of the data in this process is illustrated by thick black arrows in FIG. 1, and the operational flow is shown in FIG. 10. Block 100 of FIG. 10 indicates the first step of the decompression process wherein the first set of compressed data of the image pels of 120 pel resolution is fetched from the data memory 4 of the host processor 1, and transmitted to the unit 26 through the buffer memory 3 and the buffer memory 7. Only the first set of compressed data of the image pels (EOP) of 120 pel resolution is used in this process; the second set of compressed data of the remaining pels (RP) is not used.

Figure 11:
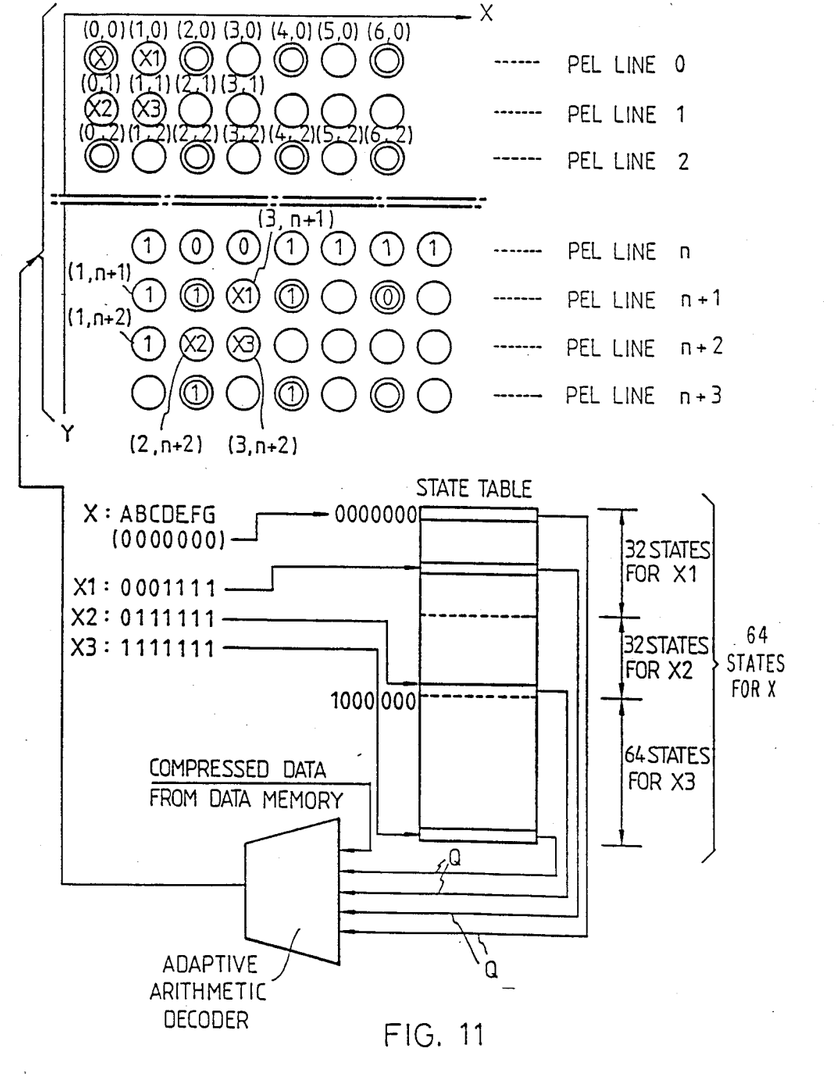
FIG. 11 shows examples of decompressing the every other pel (EOP) signal X, and the remaining pel (RP) signals X1, X2 and X3.

The transmitted first set of compressed data is decompressed by the static table and the adaptive arithmetic decoder in the adaptive arithmetic coding compression/decompression unit 26. The decompression algorithm in the control unit 27 selects the window 30 and monitors the pel position being reproduced to control the movement of the window 30. The reproduced pel signals are stored in the output image buffer 24B (block 101 in FIG. 10). FIG. 11 shows the decompression process for both (a) the first set of compressed data of the image pels (EOP) of 120 pel resolution, and (b) the second set of compressed data of the remaining pels (RP), so that partial reference to FIG. 11 will be made in explaining the decompression of the first set of compressed data. The decompression algorithm in the control unit 27 positions the window 30 on the output image buffer 24B at the position shown in FIG. 2. In this position, the values of the sampled bits A through G are all zero. Referring to FIG. 11, the seven bit state or bit pattern "0000 000" is supplied to the state table to access the entry of the address "0000 000", and the content of the fourth column of the entry, i.e., the probability of the least probable symbol which is shown as Q in FIG. 11 is supplied to the adaptive arithmetic decoder as one input. The other input is the code string of the first set of decompressed data of image pels of 120 pel resolution (EOP) transmitted from the data memory 4 of the host processor 1. The adaptive arithmetic decoder reproduces the pel signal at the position (0, 0) and stores the reproduced pel signal in the pel position (0, 0) of the output image buffer 24B. Next, the decompression algorithm rightwardly shifts the window 30 on the output image buffer 24B by two pel positions, as shown in FIG. 3. The pel signal of the pel position (2, 0) is reproduced in the same manner as that of the pel signal at (0, 0), and the reproduced pel signal is stored in the pel position (2, 0) in the output image buffer 24B. In this manner, the EOP signals of the 120 pel resolution image are reproduced and stored in the alternate pel positions (0, 0), (2, 0), (4, 0) . . . , (0, 2), (2, 2) . . . to the last position in the output image buffer 24B. These reproduced pel signals of the 120 pel resolution image, which are shown as double circled pel signals in FIG. 11, are supplied to the memory 28 of 120 pel resolution shown in FIG. 1 and then supplied to the display unit 22 of 120 pel resolution. This operation is shown as block 102 in FIG. 10.

It should be noted that in the decompression process of the image pels of 120 pel resolution, only the double circled pel signals in FIG. 11 are reproduced. The single circled pel signals at the positions (1, 0), (3, 0), (5, 0) . . . in the pel line 0, at the positions (0, 1), (1, 1) . . . in the pel line 1, at the positions (1, 2), (3, 2) . . . in the pel line 2, and in the pel lines n, n+1, n+2 and n+3, have not yet been reproduced, so that at the end of the decompression of the image of the original document at the 120 pel resolution, all the single circled pel positions in the output image buffer 24B do not contain reproduced pel signals The bits shown in the single circled pel positions in the pel lines n, n+1, n+2 and n+3 in FIG. 11 represent examples of pel signals to be reproduced as discussed in the following description.

Decompression of the Original Image at 240 Pel Resolution

In addition to displaying the original image, it is also frequently required to print the original image of the text document. For this purpose a printer 23 may be used which, for example and convenience of explanation, may have a 240 pel resolution. Similarly, a 240 pel resolution display could be used in place of printer 23.

To reproduce the original image at 240 pel resolution, (1) the transmission and decompression of the first set of compressed data representing the image pels (EOP) of 120 pel resolution described above and indicated by the thick black arrows in FIG. 1, is performed, and (2) the transmission and decompression of the second compressed data representing the remaining pels (RP) which are indicated by thick shaded arrows, is performed.

To simplify the description, assume the first set of compressed data of the image pels of 120 pel resolution have been transmitted to the terminal device 2, and the reproduced pel signals of 120 pel resolution have been stored in the output image buffer 24B, as shown by the double circled pel signals in FIG. 11, through the blocks 100 and 101 of FIG. 10. The process proceeds to block 103 of FIG. 10. The second set of compressed data of the remaining pels is transmitted to the terminal device 2 through the buffer memory 3, and is supplied as one input of the adaptive arithmetic decoder, as shown in FIG. 11.

The decompression algorithm in the control unit 27 starts the decompression process from the remaining pel, i.e., the single circled pel, at the position (1, 0) shown at the top of FIG. 11, which becomes the current pel. The algorithm detects the signal at the position (1, 0), as shown by block 104 in FIG. 10, and treats this signal as the pel signal X1 since two double circled pel signals exist at both the left and right side positions (0, 0) and (2, 0). In block 105 of FIG. 10, the decompression algorithm selects the window 31 of the form shown in FIG. 6 for the pel signal X1. The binary values of the neighboring pel signals sampled by the window 31 are those of the seven bit state or the bit pattern, which are supplied, in block 108 of FIG. 10, to the state table as the address for accessing the entry of the state table. The value Q, i.e., the probability of the least probable symbol in the accessed entry, is supplied to the adaptive arithmetic decoder, as shown in FIG. 11, to reproduce the pel signal X1. The reproduced pel signal X1 is stored in the pel position (1, 0) of the output image buffer 24B. The decompression algorithm finds the next RP position (3, 0), recognizes the pel signal at the position (3, 0) as the pel signal X1, and selects the window 31 to reproduce the next pel signal X1. In this manner, the RP signals, i.e., single circled pel signals in the pel line 0 are reproduced in the output image buffer 24B.

The decompression algorithm next determines that the RP signal at the position (0, 1) in the next line, pel line 1, is the pel signal X2. Following from this, the algorithm then: selects, in block 106, the window 32 of the form shown in FIG. 7, for the pel signal X2; reproduces the pel signal X2; and stores it in the pel position (0, 1) in block 108. The algorithm then: returns through 108A to block 104; determines that the next pel signal at (1, 1) is the pel signal X3; selects, in block 107, the window 33 of the form shown in FIG. 8, for the pel signal X3; reproduces the pel signal X3; and stores it in the pel position (1, 1) in block 108. In this manner, the remaining pel (RP) signals, i.e., single circled pel signals, existing between the already reproduced double circled pel signals, are sequentially reproduced and stored in the output image buffer 24B.

In more specifically describing the reproduction mechanics, it will be assumed that the decompression process of the RP signals has been completed to the position (1, n+1) shown in FIG. 11. The seven bit state for the next remaining pel (RP) signal X1 at the position (3, n+1), which is sampled by the window 31 of FIG. 6, is "0001111", as shown in FIG. 11. The value Q in the accessed entry of the state table is supplied to the adaptive arithmetic decoder along with the compressed data, and it may be assumed from the table that the reproduced pel signal X1 stored at the position (3, n+1) is the binary 1. Assume again that decompression continues until reproduction at the pel position (1, n+2) in the pel line n+2 has been completed. Next, the decompression algorithm treats the pel signal at the position (2, n+2) as the pel signal X2 and selects the window 32 of FIG. 7. The seven bit state for the pel signal X2 at (2, n+2) is "0111111", as shown in FIG. 11. It is assumed that the reproduced pel signal X2 at (2, n+2) is the binary 1, based on the state table. Then, the decompression algorithm finds that the next pel signal to be reproduced at (3, n+2) is the pel signal X3, and selects the window 33 of FIG. 8. The seven bit state for the pel signal X3 at (3, n+2) is "1111 111", which is supplied to access the last entry of the state table, and the value Q is supplied to the decoder along with the compressed data, whereby the binary value of the pel signal X3 at (3, n+2) is reproduced.

The decompression process is repeatedly performed until the last remaining pel signal of the original image has been decompressed and reproduced. The composite image formed by the double circled pel signals reproduced from the first set of compressed data representing image pels (EOP) of 120 pel resolution and the single circled pel signals reproduced from the second set of compressed data representing the remaining pels (RP), reproduces the original image of the text document at 240 pel resolution. The reproduced image may then be supplied to the printer 23 of 240 pel resolution for printing out the original image, in block 109 in FIG. 10.

THE ADVANTAGES OF THE PRESENT INVENTION

Figure 12:
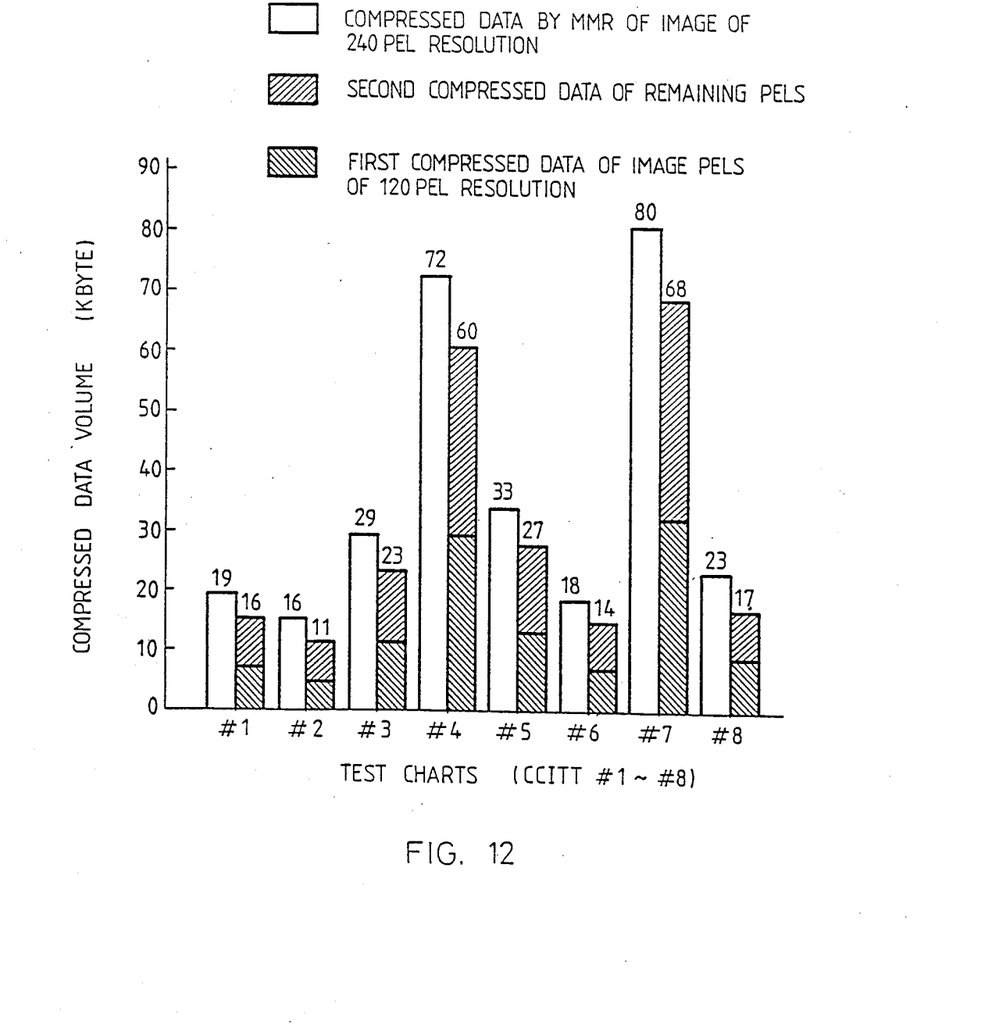
FIG. 12 shows the experimental results from comparing data volumes achieved in accordance with the present invention with data volumes obtained with the known MMR algorithm.

FIG. 12 shows experimentally produced data volumes for (1) the first set of compressed data of the image pels of 120 pel resolution, and (2) the second set of compressed data of the remaining pels, both obtained using the system and process of the present invention, and data volumes of (3) compressed data obtained by the Modified Modified Read algorithm (MMR), which is well known in the art. The experiments were performed on CCITT test charts #1-#8 (The CCITT being the International Telegraph and Telephone Consultative Committee). It will be seen from the results that the present invention realizes an average reduction of 18.5% for the charts in comparison with the MMR algorithm.

This remarkable reduction of the data volume was not achieved when a fixed pattern window was commonly used in compressing the remaining pel signals X1, X2 and X3 by the adaptive arithmetic coder. The compression ratio in such case was comparable to the results with the MMR algorithm shown in FIG. 12.

We claim:

1. An apparatus for processing pel signals representing the pels of an original image comprising:
   input image buffer means for storing pel signals representing said original image in pel positions therein;
   compression means for generating a first set of compressed data representing pel signals stored in every other pel (EOP) positions in said input image buffer means, and for generating a second set of compressed data representing pel signals stored in remaining pel (RP) positions and associated EOP positions in said input image buffer;

memory means for storing said first set of compressed data and said second set of compressed data;

decompression means for decompressing said first set of compressed data to reproduce said EOP pel signals, and for decompressing said second set of compressed data to reproduce said RP and associated EOP pel signals;

output image buffer means for storing said reproduced EOP pel signals in every other pel positions therein and said reproduced RP pel signals in remaining pel positions therein; and wherein said compression means comprises first sampling means for sequentially sampling each pel signal stored in said EOP positions in said input image buffer along with a plurality of neighboring pel signals in said EOP positions, during the generation of said first set of compressed data, and, second sampling means for sequentially sampling each pel signal stored in said RP positions along with a plurality of neighboring pel signals, including at least one pel signal in another RP position and a plurality of pel signals in said EOP positions, during the generation of said second set of compressed data; and said first sampling means comprises a window means having a sampling pattern, for sampling, as a current pel signal, each pel signal stored in said EOP positions in said input image buffer, and also sampling a plurality of neighboring pel signals in said EOP positions, selected in accordance with the pel position of said current pel signal, when generating said first set of compressed data.

2. An apparatus according to claim 1, wherein said original image is a text image, said data compression means comprises means for performing adaptive arithmetic compression, and said data decompression means comprises means for performing adaptive arithmetic decompression.

3. An apparatus for processing pel signals representing the pels of an original image comprising:

input image buffer means for storing pel signals representing said original image in pel positions therein;

compression means for generating a first set of compressed data representing pel signals stored in every other pel (EOP) positions in said input image buffer means, and for generating a second set of compressed data representing pel signals stored in remaining pel (RP) positions and associated EOP positions in said input image buffer;

memory means for storing said first set of compressed data and said second set of compressed data;

decompression means for decompressing said first set of compressed data to reproduce said EOP pel signals, and for decompressing said second set of compressed data to reproduce said RP and associated EOP pel signals;

output image buffer means for storing said reproduced EOP pel signals in every other pel positions therein and said reproduced RP pel signals in remaining pel positions therein; and wherein said compression means comprises first sampling means for sequentially sampling each pel signal stored in said EOP positions in said input image buffer along with a plurality of neighboring pel signals in said EOP positions, during the generation of said first set of compressed data, and, second sampling means for sequentially sampling each pel signal stored in said RP positions along with a plurality of neighboring pel signals, including at least one pel signal in another RP position and a plurality of pel signals in said EOP positions, during the generation of said second set of compressed data; and wherein said second sampling means comprises a plurality of sampling window means, each having a different sampling pattern, for sampling, as a current pel signal, each pel signal stored in said RP positions in said input image buffer and also sampling a plurality of neighboring pel signals, selected in accordance with the pel position of said current pel signal, when generating said second set of compressed data.

4. An apparatus as in claim 3, wherein said pel positions comprise vertical and horizontal lines in said input image buffer and said plurality of window means comprise:

first window means for sampling a pel signal stored in one of said RP positions in a horizontal line containing EOP positions, as a current pel signal and the two horizontally adjacent pel positions stored in the EOP positions in the pel line containing said current pel signal along with the pel signal stored in the RP position in the preceding pel line positioned above said current pel signal, and the two pel signals stored in EOP positions in the next but one pel line positioned below said two horizontally adjacent pel signals, respectively.

5. An apparatus as in claim 3, wherein said pel positions comprise vertical and horizontal lines in said input image buffer and said plurality of window means comprise:

second window means for sampling a pel signal stored in one of said RP positions in a vertical line containing EOP positions, as a current pel signal, and the two vertically adjacent pel signals stored in the EOP positions in preceding and next pel lines, respectively, to the pel line containing said current pel signal, along with the pel signal stored in the left adjacent RP pel position in the horizontal line of said current pel signal, and the two pel signals stored in said preceding and next pel lines positioned in the next but one pel positions of said two vertically adjacent pel signals, respectively.

6. An apparatus as in claim 3, wherein said pel positions comprise vertical and horizontal lines in said input image buffer and said plurality of window means comprise:

third window means for sampling a pel signal stored in one of said RP positions, as a current pel signal, and the four pel signals stored in the EOP positions centered about said current pel signal in the horizontal preceding and next pel lines to the horizontal line of said current pel signal, along with the pel signal stored in the RP position in said preceding pel line positioned above said current pel signal, and the pel signal stored in the left adjacent RP pel position in the line of said current pel signal.

7. An apparatus according to claim 3, wherein said original image is a text image, said data compression means comprises means for performing adaptive arithmetic compression, and said data decompression means comprises means for performing adaptive arithmetic decompression.

8. A method for processing pel signals of an original image comprising the steps of:
 (a) providing an input image buffer, an output image buffer, and a memory;
 (b) storing pel signals representing said original image in pel positions of said input image buffer;
 (c) sequentially fetching the pel signals stored in every other pel (EOP) positions in said input image buffer along with respective pluralities of neighboring pel signals stored in said EOP positions;
 (d) compressing said sequentially fetched pel signals along with their respective pluralities of neighboring pel signals to generate a first set of compressed data representing said pel signals stored in said EOP positions;
 (e) storing said first set of compressed data in said memory;
 (f) sequentially fetching the pel signals stored in remaining pel (RP) positions in said input image buffer along with respective pluralities of neighboring pel signals, including at least one signal stored in an RP position and a plurality of signals stored in said EOP positions;
 (g) compressing said sequentially fetched pel signals in said RP positions along with their respective pluralities of neighboring pel signals to generate a second set of compressed data;
 (h) storing said second set of compressed data in said memory;
 (i) decompressing said first set of compressed data to reproduce said pel signals stored at EOP positions;
 (j) storing said reproduced pel signals stored in EOP positions, in EOP positions in said output image buffer;
 (k) decompressing said second set of compressed data to reproduce said pel signals stored in RP positions along with their respective pluralities of neighboring pel signals stored in EOP positions; and
 (l) storing said reproduced pel signals stored in RP positions and said respective neighboring pel signals stored in EOP positions, respectively in RP and EOP positions of said output image buffer;
and wherein said original image is a text image, and said step (c) includes the steps of selecting a window for sampling, as a current pel signal, each of said pel signals stored in said EOP positions, and also sampling said plurality of neighboring pel signals at EOP positions selected in accordance with the pel position of said current pel signal, and moving said window on said input image buffer until all pel signals in said EOP positions have been sampled and fetched as said current pel signal.

9. A method according to claim 8, wherein said compressing in steps (d) and (g) is by adaptive arithmetic compression.

10. A method according to claim 9, wherein said decompressing in steps (i) and (k) is by adaptive arithmetic decompression.

11. A method according to claim 8, wherein said original image is a text image, said compression steps comprise performing adaptive arithmetic compression, and said data decompression steps comprise performing adaptive arithmetic decompression.

12. A method for processing pel signals of an original image comprising steps of:
 (a) providing an input image buffer, an output image buffer, and a memory;
 (b) storing pel signals representing said original image in pel positions of said input image buffer;
 (c) sequentially fetching the pel signals stored in every other pel (EOP) positions in said input image buffer along with respective pluralities of neighboring pel signals stored in said EOP positions;
 (d) compressing said sequentially fetched pel signals along with their respective pluralities of neighboring pel signals to generate a first set of compressed data representing said pel signals stored in said EOP positions;
 (e) storing said first set of compressed data in said memory;
 (f) sequentially fetching the pel signals stored in remaining pel (RP) positions in said input image buffer along with respective pluralities of neighboring pel signals, including at least one signal stored in an RP position and a plurality of signals stored in said EOP positions;
 (g) compressing said sequentially fetched pel signals in said RP positions along with their respective pluralities of neighboring pel signals to generate a second set of compressed data;
 (h) storing said second set of compressed data in said memory;
 (i) decompressing said first set of compressed data to reproduce said pel signals stored at EOP positions;
 (j) storing said reproduced pel signals stored in EOP positions, in EOP positions in said output image buffer;
 (k) decompressing said second set of compressed data to reproduce said pel signals stored in RP positions along with their respective pluralities of neighboring pel signals stored in EOP positions; and
 (l) storing said reproduced pel signals stored in RP positions and said respective neighboring pel signals stored in EOP positions, respectively in RP and EOP positions of said output image buffer;
and wherein said step (f) includes the step of selecting one of a plurality of sampling windows, each having a different sampling pattern, for sampling, as a current pel signal, each of said pel signals stored in said RP positions in said input image buffer, and also sampling said respective plurality of neighboring pel signals at positions selected in accordance with the pel position of said current pel signal, until all pel signals in said RP positions have been sampled and fetched as said current pel signal.

13. A method as in claim 12, wherein said pel positions comprise vertical and horizontal lines in said input image buffer and said plurality of windows include: a third window for sampling, as a current pel signal, a pel signal stored in an RP position in a horizontal current pel line, and for sampling four pel signals which include EOP positions centered about said current pel signal in the horizontal preceding and next pel lines to the line of said current pel signal, along with one pel signal stored in the RP position in said preceding pel line positioned above said current pel signal, and one pel signal stored in the left adjacent pel position in the line of said current pel signal.

14. A method as in claim 12, wherein said pel positions comprise vertical and horizontal lines in said input image buffer and said plurality of windows include: a first window having a sampling pattern for sampling, as a current pel signal, a pel signal stored in an RP position in a current horizontal pel line containing EOP positions, and for sampling the two horizontally adjacent pel signals stored in the EOP pel positions between which the current pel is interposed in said current pel line; the pel signal stored in the RP position above said current pel signal in the preceding pel line; and the two pel signals stored in EOP positions in the next but one pel line below said two horizontally adjacent pel signals, respectively.

15. A method as in claim 12, wherein said pel positions comprise vertical and horizontal lines in said input image buffer and said plurality of windows include: a second window for sampling, as a current pel signal, a pel signal stored in an RP position in a vertical pel line containing EOP positions, and for sampling the two vertically adjacent pel signals stored in the EOP positions in preceding and next horizontal pel lines, respectively, to the pel line containing said current pel signal, along with the pel signal stored in the left adjacent RP pel position in the horizontal line of said current pel signal, and the two pel signals stored in said preceding and next pel lines positioned in the next but one pel positions of said two vertically adjacent pel signals, respectively.

16. A method according to claim 13, wherein said original image is a text image, said compressing steps comprise performing adaptive arithmetic compression, and said data decompressing steps comprise performing adaptive arithmetic decompression.

17. A method according to claim 13, wherein said compressing in steps (d) and (g) is by adaptive arithmetic compression.

18. A method according to claim 17, wherein said decompressing in steps (i) and (k) is by adaptive arithmetic decompression.

* * * * *